United States Patent

[11] 3,585,854

[72] Inventors Neville G. Hanson
Whitley Bay;
Robert P. Hanson, Ryton-on-Tyne, both of, England
[21] Appl. No. 720,606
[22] Filed Apr. 11, 1968
[45] Patented June 22, 1971
[73] Assignee Marine and Industrial Scientific & Technical Services Ltd.
Ryton, England
[32] Priority Apr. 17, 1967, Mar. 11, 1968
[33] Great Britain
[31] 17,600/67 and 11,831/68

[54] METHOD AND APPARATUS FOR INDICATING SURFACE ROUGHNESS
8 Claims, 3 Drawing Figs.
[52] U.S. Cl. ............................................ 73/105, 73/78
[51] Int. Cl. ............................................ G01b 5/28
[50] Field of Search .................................. 73/104, 105, 78

[56] References Cited
UNITED STATES PATENTS
2,035,220 3/1936 Bramberry .................. 73/105
2,329,084 9/1943 Reason ...................... 73/105

Primary Examiner—Richard C. Queisser
Assistant Examiner—C. E. Snee, III
Attorney—Sughrue, Rothwell, Mion, Zinn & Macpeak ABSTRACT: A method and apparatus for indicating the surface roughness of a surface of a material comprising passing an erodable probe along a predetermined path across the surface and transmitting movement corresponding to the amount of probe thereby removed to an indicator. The device for indicating the surface roughness includes a support plate having legs which may be magnetic, contacting the surface, a guide connected to the support plate for guiding an erodable probe along a path across the surface, and a holder for the erodable probe connected to the guide and loaded under a predetermined pressure by a spring. The indicator is carried by the support plate with appropriate linkage connecting the holder and the indicator. A casing is rotatable above the support plate for transmitting rotational movement to the probe.

3,585,854

METHOD AND APPARATUS FOR INDICATING SURFACE ROUGHNESS

The present invention concerns a method and apparatus for indicating the surface roughness of material surfaces.

The measurement of the surface roughness, particularly of blast-cleaned and machined steel surfaces has been a problem which, despite considerable efforts, has defied satisfactory and economical solution.

An object of the present invention is to provide a readily portable device which may be used on site for accurately indicating surface roughness, particularly of blast-cleaned and machined metal surfaces, and for possible correlation of such indication with surface treatment methods.

According to the present invention a method of indicating the surface roughness of a surface of a material comprises passing an erodible probe along a predetermined path across the surface and transmitting movement corresponding to the amount of probe thereby removed to an indicator.

Also according to the present invention, a device for indicating surface roughness by passing an erodible probe along a predetermined path across the surface and transmitting movement corresponding to the amount of probe thereby removed to an indicator comprises a support means spaced apart from said surface and carrying a holder for an erodible probe which is loaded to maintain a predetermined pressure, the holder being displaceable relative to the surface and support means and being connectable to an indicator by a linkage; traversing means also being provided for displacement of the holder.

The holder for an erodible probe may be rotatably mounted on the support which will have a space provided for the linkage connecting the probe holder with the indicator.

The traversing means may comprise an arm connected with the holder or, alternatively, a cover may be provided which is connected with the holder for rotation thereof along a predetermined arcuate path. In the latter case the indicator may be rotatable with the cover and probe holder.

The probe holder may be spring-biased so as to maintain the probe at a predetermined pressure against the surface and the linkage comprise a substantially upright rod formed as an extension of the spring-biased probe holder and communicating with and operating the indicator. The linkage rod, particularly if the indicator is to remain stationary when the probe holder is moved, may be formed in two sections, the abutting end of each section being provided with a dome-shaped cap, one or both of which may be secured by means of a screw thread for adjustment purposes.

The indicator may be any known device which translates small displacements into an accurately discernible form and may be calibrated in one-thousandth of an inch or in any other manner applicable to the use for which the device of the invention is intended.

The roughness of the surface is indicated by measuring the amount of probe removed by friction caused when the probe is passed across the surface. The wear of the probe, which may be made, e.g. of carbon, is directly related to the surface roughness or profile. Preferably the probe is passed over the surface both directions through an arc of at least 90° so that the surface roughness is measured in every direction.

The support on which the probe holder is mounted may be spaced apart from the surface by the provision of three or more magnetized legs the ends of which, when the device is not in use, are protected by removable "keeps." In addition, the probe and probe holder are to be protected when the device is not in use and this is accomplished by the provision of a cam and lever which act upwardly against a portion of the linkage to optionally raise and retain the tip of the probe above the surface on which the device rests.

In a preferred embodiment of the invention the device comprises a support plate having three magnetized legs arranged about its periphery and a further plate rotatably mounted thereon and supporting an indicator, a cover, a probe holder and a linkage connecting said holder with the indicator. An arcuate slot is provided in support plate to permit a predetermined rotation of the probe and probe holder by the manual rotation of the cover. A cam and associated lever is provided in the wall of the cover to enable the probe holder to be optionally raised to an inoperative position.

In operation, the "keeps" are removed from the magnetized legs and the device is placed on a surface. The indicator is set at zero and the probe is moved along the predetermined path and returned to its original position. The reading on the indicator gives a measure of the average surface roughness.

The invention will be described further, by way of example, with reference to the accompanying drawings, in which.

Figure 1:
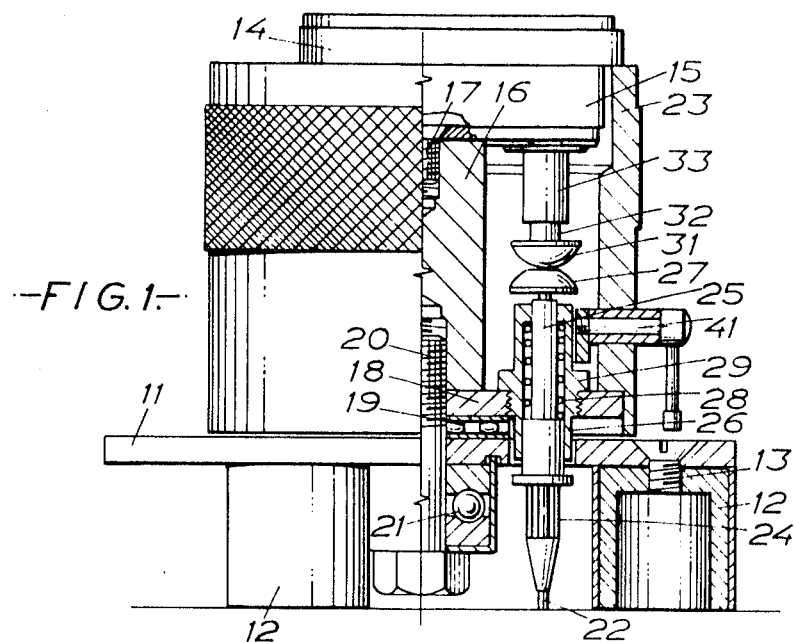
FIG. 1 is a partial cutaway section of a device for indicating surface roughness.
Figure 2:
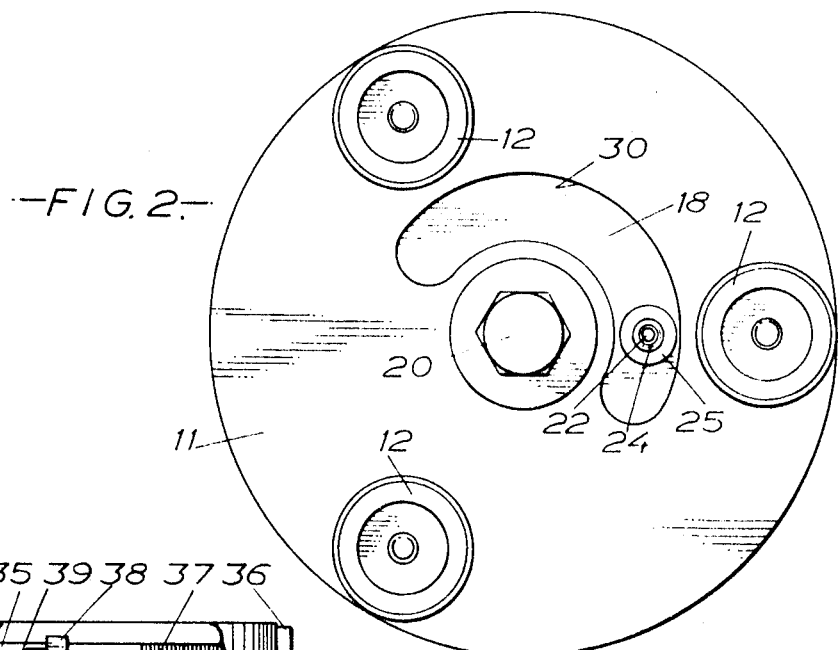
FIG. 2 is an underneath plan view of the device.
Figure 3:
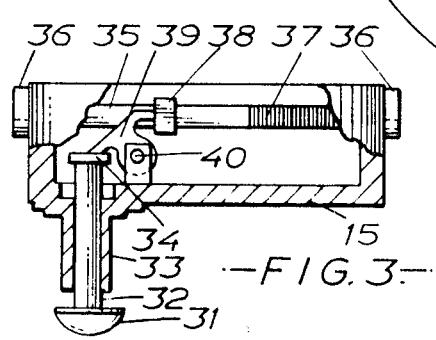
FIG. 3 is a partial section through the gauge housing showing movement transmission for operating the gauge.

The device shown in FIGS. 1 to 3 comprises a supporting plate 11 provided with three magnetic legs 12 secured by screws 13 to plate 11. The magnetic legs 12 when the device is not in use are provided with "keeps" (not shown) to ensure the contact surfaces are kept clean.

A gauge mechanism 14 (not shown in detail) of known kind is locatable in cylindrical gauge housing 15 which is retained on support pillar 16 by a screw 17 extending through the base of the housing 15. Support pillar 16 is securely mounted on a further plate 18 which in turn is rotatably mounted by means of roller race 19, on the plate 11. Support pillar 16 and rotatable plate 19 are held together by a screw 20 extending through plates 11 and 18 and engaging in a tapped bore in pillar 16. A ball race 21 is provided beneath plate 11 to enable the head of screw 20 to rotate with plate 18 and pillar 16.

A spring-biased erodable probe 22 provided on rotatable plate 18, is axially displaceable and communicates with members operating the gauge mechanism 14 which members will be described subsequently in more detail. A cover 23 is provided and adapted to be secured to plate 18 so that manual rotation of the cover 23 will cause the plate 18, pillar 16, gauge 14, probe 22 and associated members to also rotate.

The probe 22 is held in a holder 24 of known construction (similar to a pencil-lead holder) and is connected to rod 25 slidable in sleeve 26. A dome-shaped cap 27 is screwed to the end of the rod 25 and an enlargement and further flanged portion are formed in the lower region of the rod 25. A spring 28 is provided in sleeve 26 compressed between a reduced diameter portion in the upper region of sleeve 26 and the enlargement formed in the lower region of rod 25 so as to bias the rod 25 and hence probe 22 downwardly. A middle portion of sleeve 26 is provided with a flange 29 which is secured to rotatable plate 18. An arcuate slot 30 (FIG. 2) accommodating a portion of sleeve 26 is provided in plate 11 so as to enable the plate 18 to be rotated.

An inverted dome-shaped cap 31 is formed on one end of a connecting rod 32 slidable in cylinder 33 which is securely mounted on the bottom of gauge housing 15. The cap 31 is located directly above the cap 27, and the other end of rod 32 passes through a bore in the housing 15 and has an enlarged section or plate 34 formed in its end being axially displaceable in and above a recessed portion formed in the base of gauge housing 15. A pin (not shown) is provided cooperating with a slot in plate 34 to prevent rotation thereof.

A lever arrangement is provided in gauge housing 15 for converting axial vertical displacements of the rod 32 into horizontal displacements so as to enable the gauge mechanism 14 to be operated. This arrangement comprises an axially displaceable horizontal rod 35 having its ends located in blind bores 36 secured in the wall of housing 15 and a finely machined toothed portion 37 for engagement with the first drive wheel of the standard gauge mechanism 14. The rod 35 is biased to move a stop 38 towards the plate 34 by means of a spring (now shown) extending parallel to rod 35 and secured at one end to housing 15 and at the other to an extension (not shown) secured at right angles to rod 35.

A crank arm 39 is pivoted at 40 with one arm abutting against stop 38 located on rod 35 and the other abutting against the horizontal surface of plate 34. From this, and the fact that stop 38 is spring biased towards plate 34, it will be appreciated that cap 31 is biased downwardly, as is cap 27.

In the operative position the probe 22 will extend below the plane in which the end of supports 12 lie so that, when placed on a surface, the probe will be in positive engagement with said surface. To prevent damage to the probe 22 when not in use, a cam and lifting arm 41 is provided in cover 23 and adapted to enable the cap 27 and hence probe 22 to be raised out of engagement with the surface to be tested by the cam acting upwardly against cap 27.

In operation the "keeps" are removed from the magnetic supports 12 and the surface of the supports are cleaned. The probe 22 is in its starting position. The device is placed on the surface of the material to be tested, which should be dust free, by gently lowering it at an angle of 45° to the surface, so that contact is first established between the surface and the two magnets furthest from the probe. The third magnet is then allowed to contact the surface gently. Once in position the device will be held firmly by the magnets. The device should be steadied by the hand during operation. The probe 22 is then lowered onto the surface of the material by operation of lever and cam 39.

The gauge 14 is then zero set and the probe is moved over the full distance and returned by rotation of cover 23. The reading on the gauge gives a measure of the surface roughness. The gauge will usually be calibrated to give a measure of the average surface roughness in thousandths of an inch.

It is to be understood that in order to encompass the considerable amount of variation in material surfaces, the probe, the locus of probe travel, the pressure and indicators used may also be varied. Also, it will be appreciated that the quality and use of the erodible probe, should be carefully controlled since the calibration and preparation of tables will have to be standardized.

The pointer of the indicator may be reset at zero on the dial before each operation is carried out by adjustment of a lost motion coupling member in the linkage (e.g. adjustment of caps 27 or 31 or sleeve 26) and a fresh probe is preferably used for each test carried out.

A device in accordance with the present invention has the advantage that it is portable, requires no external power, is manually operated and may produce a direct visual reading without any subsequent processing being necessary.

The device is applicable not only for indicating the roughness of the abrasive blast-cleaned metal surfaces but also for determining the smoothness or otherwise of machined metal surfaces and more generally in connection with other materials, for example in providing a reproducible characteristic reading for paper by indicating its surface roughness.

The device is particularly useful in determining the type and quantity of paint to be used on a surface since realization of surface roughness is an important factor when choosing a paint system. Paints designed to give, for example, low dry film thickness require a smooth surface having a minimum peak to trough amplitude whereas a paint designed to give a high film thickness would be more tolerant to a rougher surface texture with a higher peak to trough amplitude.

I claim:

1. A method of indicating the surface roughness of a material, comprising passing along a predetermined arcuate path across said surface an erodible probe of softer material than that forming the surface, and transmitting movement corresponding to the amount of probe thereby removed to an indicator.

2. A device for indicating the surface roughness of a material, comprising a support having spacing means for contacting the surface, guide means displaceably connected to said support for guiding along a predetermined arcuate path across said surface an erodible probe of softer material than that forming the surface, a holder for said erodible probe and movable therewith connected to said guide means and spring-biased so as to press the erodible probe against the surface with a predetermined pressure, an indicator carried by the support and having a movable pointer, a linkage connectable to the holder and the pointer of said indicator for transmitting movement of the holder to the pointer, and a traversing means connected to said guide means for moving said guide relative to the support.

3. A device according to claim 2 wherein said guide means is rotatable.

4. A device according to claim 3 wherein a cover secured to said guide means forms said traversing means.

5. A device according to claim 4 wherein said spacing means are magnetized

6. A device according to claim 5 wherein said linkage is adjustable for zeroing said indicator.

7. A device according to claim 6 wherein said linkage has inactivating means for optionally raising and retaining said probe in an inoperative position.

8. A device for indicating the surface roughness of a magnetizable material comprising; a support plate having a predetermined arcuate slot positioned about the center of the plate; magnetic spacing legs connected to the bottom of the support plate and capable of magnetically adhering to the material; an erodible probe of softer material than that forming the surface of the material; a holder for the erodible probe operatively positioned in the arcuate slot and loaded under a predetermined pressure to press the erodible probe against the surface, an indicator positioned on the support plate and operatively connected to the holder for indicating the roughness of the surface, and casing means positioned above the support plate and around the arcuate slot and operatively connected to the probe holder for transmitting a rotational force to the erodible probe to cause it to move across the material surface along the length of the arcuate slot.